US012587785B2

(12) United States Patent
Mariglio, III

(10) Patent No.: US 12,587,785 B2
(45) Date of Patent: Mar. 24, 2026

(54) ADAPTIVE FILTERBANKS USING SCALE-DEPENDENT NONLINEARITY FOR PSYCHOACOUSTIC FREQUENCY RANGE EXTENSION

(71) Applicant: Boomcloud 360 Inc., Encinitas, CA (US)

(72) Inventor: Joseph Anthony Mariglio, III, Encinitas, CA (US)

(73) Assignee: Boomcloud 360 Inc., Encinitas, CA (US)

( * ) Notice: Subject to any disclaimer, the term of this patent is extended or adjusted under 35 U.S.C. 154(b) by 0 days.

(21) Appl. No.: 18/237,727

(22) Filed: Aug. 24, 2023

(65) Prior Publication Data

US 2024/0137697 A1 Apr. 25, 2024

Related U.S. Application Data

(63) Continuation of application No. 17/471,012, filed on Sep. 9, 2021, now Pat. No. 11,838,732.

(Continued)

(51) Int. Cl.
*H04R 3/04* (2006.01)

(52) U.S. Cl.
CPC .................................... *H04R 3/04* (2013.01)

(58) Field of Classification Search
CPC .......... H04R 3/04; G10L 19/24; G10L 21/038
See application file for complete search history.

(56) References Cited

U.S. PATENT DOCUMENTS 6,442,277 B1 8/2002 Lueck et al.
9,674,609 B2 6/2017 Katayama et al.

(Continued)

FOREIGN PATENT DOCUMENTS

CN 1176034 A 3/1998
CN 105580075 A 5/2016

(Continued)

OTHER PUBLICATIONS

PCT International Search Report and Written Opinion, PCT Application No. PCT/US2022/037182, Nov. 11, 2022, 9 pages.

(Continued)

*Primary Examiner* — James K Mooney
(74) *Attorney, Agent, or Firm* — Fenwick & West LLP

(57) ABSTRACT

A system provides for psychoacoustic frequency range extension. The system generates quadrature components from an audio channel, and generates rotated spectral quadrature components by applying a forward transformation that rotates a spectrum of the quadrature components from a standard basis to a rotated basis. In the rotated basis, the system isolates components of the rotated spectral quadrature components at target frequencies, and generates weighted phase-coherent harmonic spectral quadrature components by applying a nonlinearity to the isolated components having a dependence on scale that is subject to constraints. The circuitry generates a harmonic spectral component by applying an inverse transformation that rotates a spectrum of the weighted phase-coherent harmonic spectral quadrature components from the rotated basis to the standard basis. The circuitry combines the harmonic spectral component with frequencies of the audio channel outside of the target frequencies to generate an output channel, and provides the output channel to a speaker.

25 Claims, 9 Drawing Sheets

Related U.S. Application Data

(60) Provisional application No. 63/222,370, filed on Jul. 15, 2021.

(56) References Cited

U.S. PATENT DOCUMENTS

| | | | | |
|---|---|---|---|---|
| 10,194,258 | B2 | 1/2019 | Lacouture Parodi | |
| 10,299,056 | B2 | 5/2019 | Walsh et al. | |
| 11,006,216 | B2 | 5/2021 | Mariglio, III | |
| 2011/0135115 | A1* | 6/2011 | Choi | H04R 3/04 381/107 |
| 2012/0316885 | A1 | 12/2012 | Gibbs | |
| 2015/0245157 | A1 | 8/2015 | Seefeldt | |
| 2016/0037275 | A1 | 2/2016 | Drullinger et al. | |
| 2016/0267917 | A1 | 9/2016 | Disch et al. | |
| 2017/0230772 | A1 | 8/2017 | Johnson et al. | |
| 2018/0213342 | A1 | 7/2018 | Geiger et al. | |
| 2018/0242083 | A1* | 8/2018 | Lindemann | H04R 3/04 |
| 2019/0200146 | A1 | 6/2019 | Button et al. | |
| 2020/0162817 | A1* | 5/2020 | Neoran | H04S 7/307 |
| 2020/0245081 | A1 | 7/2020 | Elmedyb et al. | |
| 2020/0402529 | A1 | 12/2020 | Olivieri et al. | |
| 2021/0006918 | A1 | 1/2021 | Munoz et al. | |
| 2021/0044898 | A1 | 2/2021 | Mariglio | |

FOREIGN PATENT DOCUMENTS

| | | | |
|---|---|---|---|
| JP | 2002171182 | A | 6/2002 |
| JP | 2012-528344 | A | 11/2012 |
| KR | 10-2011-0065063 | A | 6/2011 |
| KR | 10-2019-0118612 | A | 10/2019 |
| KR | 10-2055701 | B1 | 12/2019 |
| TW | 202107450 | A | 2/2021 |
| TW | 202110197 | A | 3/2021 |
| WO | WO 2021/021707 | A1 | 2/2021 |
| WO | WO 2021/026314 | A1 | 2/2021 |

OTHER PUBLICATIONS

United States Office Action, U.S. Appl. No. 17/471,012, Jan. 30, 2023, 8 pages.

China National Intellectual Property Administration, Office Action, Chinese Patent Application No. 202280048258.1, May 30, 2024, 11 pages.

The Japan Patent Office, Office Action, Japanese Patent Application No. 2024-501919, Aug. 6, 2024, five pages.

Taiwan Intellectual Property Office, Office Action, Taiwanese Patent Application No. 113136859, May 5, 2025, eight pages.

European Patent Office, Extended European Search Report, European Patent Application No. 22842889.2, Jan. 31, 2025, nine pages.

Gardner, W. G. "3-D Audio Using Loudspeakers." Dissertation, Massachusetts Institute of Technology, Sep. 1997, pp. 1-153.

Lacouture Parodi, Y. "Analysis and Design Parameters for Crosstalk Cancellation Filters Applied to Different Loudspeaker Configurations." Audio Engineering Society $125^{th}$ Convention, San Francisco, CA, USA, Oct. 2-5, 2008, pp. 1-17.

Masiero, B. et al. "Two Listeners Crosstalk Cancellation System Modelled by Four Point Sources and Two Rigid Spheres." Acta Acustica United with Acustica, vol. 95, vol. 95, No. 2, Mar. 2009, pp. 379-385.

Taiwan Intellectual Property Office, Office Action, Taiwanese Patent Application No. 111126590, Sep. 15, 2023, 19 pages.

* cited by examiner

ADAPTIVE FILTERBANKS USING SCALE-DEPENDENT NONLINEARITY FOR PSYCHOACOUSTIC FREQUENCY RANGE EXTENSION

CROSS REFERENCE TO RELATED APPLICATION

This application is a continuation of U.S. patent application Ser. No. 17/471,012, filed Sep. 9, 2021, which claims the benefit of U.S. Provisional Application No. 63/222,370, filed Jul. 15, 2021, which is incorporated by reference in its entirety.

TECHNICAL FIELD

This disclosure relates generally to audio processing, and more specifically to producing the impression of frequencies beyond a physical driver's bandwidth.

BACKGROUND

The bandwidth of loudspeakers, headphones, and other acoustic actuators is often limited to a sub-domain of the bandwidth of the human auditory system. This is most often a problem in the low frequency region of the audible spectrum, roughly 18 Hz to 250 Hz. It is desirable to modify an audio signal to produce the impression of frequencies beyond the bandwidth of a physical driver.

SUMMARY

Some embodiments include a system including a circuitry (e.g., one or more processors) that provides for psychoacoustic frequency range extension for a speaker. The circuitry generates quadrature components from an audio channel defining a quadrature representation of the audio channel, and generates rotated spectral quadrature components by applying a forward transformation that rotates a spectrum of the quadrature components from a standard basis to a rotated basis. In the rotated basis, the circuitry isolates components of the rotated spectral quadrature components at target frequencies, and generates weighted phase-coherent harmonic spectral quadrature components by applying a nonlinearity to the isolated components having a dependence on scale that is subject to constraints. The circuitry generates a harmonic spectral component by applying an inverse transformation that rotates a spectrum of the weighted phase-coherent harmonic spectral quadrature components from the rotated basis to the standard basis. The circuitry combines the harmonic spectral component with frequencies of the audio channel outside of the target frequencies to generate an output channel, and provides the output channel to the speaker.

In some embodiments, the nonlinearity includes a weighted mixture of constituent nonlinearities. The constraints each include a constraint on a gain correction applied to an input of a respective constituent nonlinearity.

In some embodiments, the nonlinearity includes a weighted summation of Chebyshev polynomials of the first kind with magnitudes being selectively factored out subject to the constraints.

In some embodiments, the circuitry is further configured to generate a plurality of harmonic spectral components. Each harmonic spectral component being generated using a different frequency band of the audio channel. The circuitry is configured to generate the output channel by combining the plurality of harmonic spectral components.

In some embodiments, the circuitry is configured to generate the plurality of harmonic spectral components in series with each downstream harmonic spectral component being generated using as an input a residual of an upstream harmonic spectral component.

In some embodiments, the circuitry is configured to generate the plurality of harmonic spectral components in parallel.

In some embodiments, the circuitry is further configured to apply an odd linearity to the harmonic spectral component.

In some embodiments, the harmonic spectral component includes different frequencies from the target frequencies of the audio channel and produces a psychoacoustic impression of the target frequencies when rendered by the speaker.

In some embodiments, the forward transform rotates the spectrum of the quadrature components such that a target frequency is mapped to 0 Hz. The inverse transform rotates the spectrum of the weighted phase-coherent harmonic spectral quadrature components such that 0 Hz is mapped to the target frequency.

In some embodiments, the target frequencies include a frequency between 18 Hz and 250 Hz.

In some embodiments, the circuitry determines the target frequencies based on a reproducible range of the speaker, reduction of power consumption of the speaker, or increased longevity of the speaker.

In some embodiments, the speaker is a component of a mobile device.

In some embodiments, the circuitry is further configured to isolate the components at target magnitudes using a gate function. In some embodiments, the circuitry is further configured to apply a smoothing function to the isolated components.

Some embodiments include a method. The method includes, by a circuitry: generating quadrature components from an audio channel defining a quadrature representation of the audio channel; generating rotated spectral quadrature components by applying a forward transformation that rotates a spectrum of the quadrature components from a standard basis to a rotated basis; in the rotated basis: isolating components of the rotated spectral quadrature components at target frequencies; and generating weighted phase-coherent harmonic spectral quadrature components by applying a nonlinearity to the isolated components having a dependence on scale that is subject to constraints; generating a harmonic spectral component by applying an inverse transformation that rotates a spectrum of the weighted phase-coherent harmonic spectral quadrature components from the rotated basis to the standard basis; combining the harmonic spectral component with frequencies of the audio channel outside of the target frequencies to generate an output channel; and providing the output channel to a speaker.

Some embodiments include a non-transitory computer readable medium comprising stored instructions that, when executed by at least one processor, configure the at least one processor to: generate quadrature components from an audio channel defining a quadrature representation of the audio channel; generate rotated spectral quadrature components by applying a forward transformation that rotates a spectrum of the quadrature components from a standard basis to a rotated basis; in the rotated basis: isolate components of the rotated spectral quadrature components at target frequencies; and generate weighted phase-coherent harmonic spectral quadrature components by applying a nonlinearity to the isolated components having a dependence on scale that is subject to constraints; generate a harmonic spectral component by applying an inverse transformation that rotates a spectrum of the weighted phase-coherent harmonic spectral quadrature components from the rotated basis to the standard basis; combine the harmonic spectral component with frequencies of the audio channel outside of the target frequencies to generate an output channel; and provide the output channel to a speaker.

Figure 1:
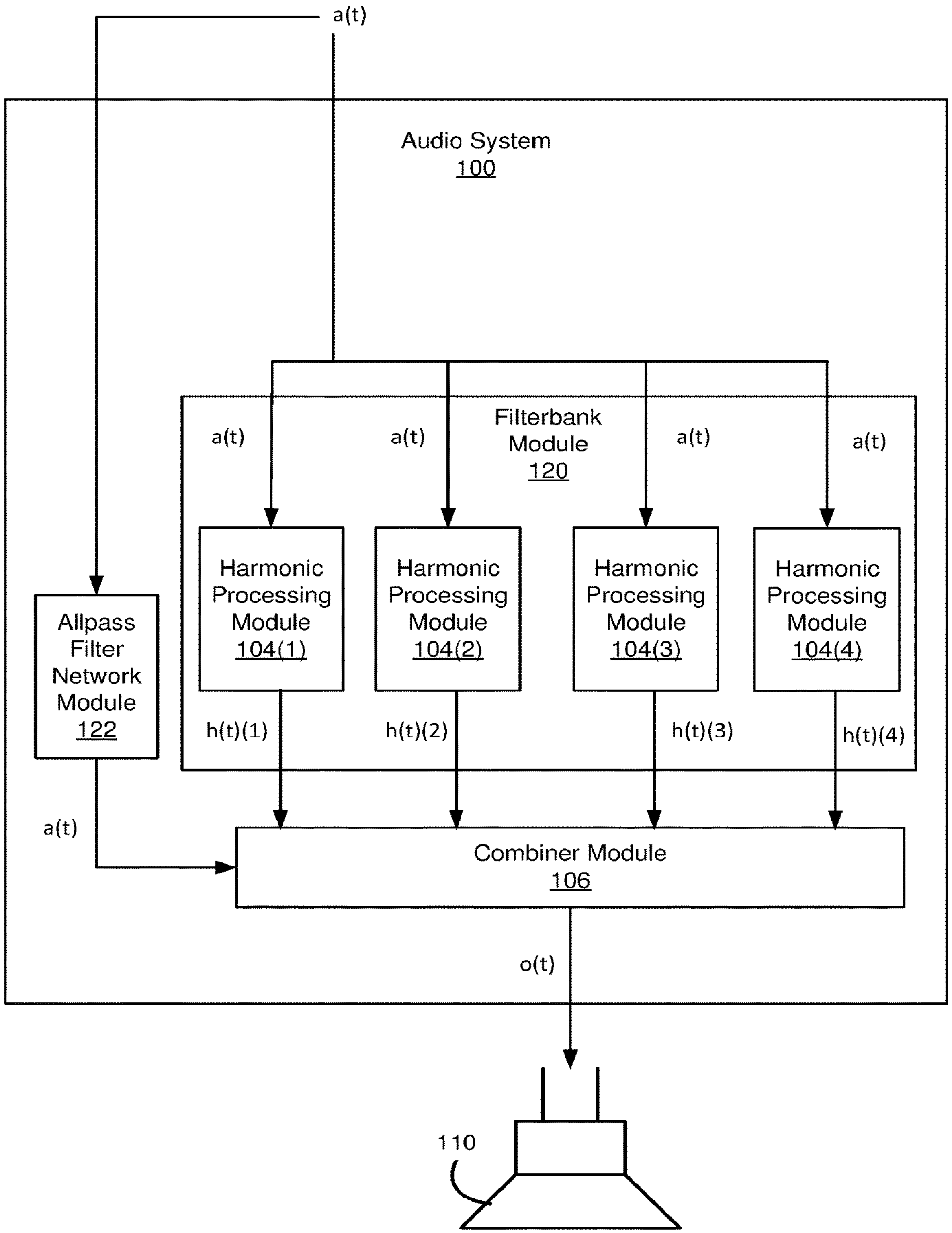
FIG. 1 is a block diagram of an audio system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to providing psychoacoustic frequency range extension. Because the human auditory system responds to cues in a nonlinear way, it is possible to use psychoacoustic phenomena to create a virtual stimulus where the actual stimulus is not feasible. An audio system may include a circuitry that provides an adaptive nonlinear filterbank which uses a highly tunable nonlinearity having a dependence on scale that is subject to constraints. The nonlinearity is used to generate weighted phase-coherent harmonic spectra from one or more subbands of an audio channel. The nonlinearity may include a weighted mixture of constituent nonlinearities. The constraints may each include a constraint on a gain correction applied to an input of a respective constituent nonlinearity. Independent constraints may be applied to each constituent nonlinearity in a sum defining the nonlinearity, which allows for selective spectral animation among a chosen subset of generated harmonics. This allows for a much more natural effect to be achieved, which generalizes successfully across content. Furthermore, it reduces the perceptual salience of intermodulation artifacts, potentially allowing for a smaller number of filters to be employed, with broader bandwidths. In some embodiments, the nonlinearity includes a weighted summation of Chebyshev polynomials of the first kind with magnitudes being selectively factored out subject to the constraints. The phase-coherent harmonic spectra for the one or more subbands produce the impression of the subbands when the frequencies of the subbands are beyond a physical driver's bandwidth.

In some embodiments, the adaptive nonlinear filterbank may include multiple harmonic processors. Each harmonic processor includes a non-linear filter that analyzes a targeted subband within the audio signal and resynthesizes data of the subband with a configurable spectral transformation. The harmonic processors each generate a harmonic spectral component using a different frequency band of an audio channel, and these harmonic spectral components are combined to generate an output channel. The harmonic spectral components may be generated in parallel or in series. In the series case, each downstream harmonic spectral component uses as an input a residual of an upstream harmonic spectral component. The parallel case, though conceptually simple, occasionally results in a difficult tuning process, such as when the parallel design did not constrain the power spectrum of the content analyzed. By utilizing a serial architecture, where subsequent filters act only on the residual of the input signal, the total spectral power is conserved at the input to the filterbank. The result is a filterbank architecture whose constituent filters are not subject to constructive interference.

Advantages of frequency range extension include allowing (e.g., low quality) speakers that are incapable of rendering certain frequencies to produce a psychoacoustic impression of those frequencies. Low cost speakers, such as those commonly found on mobile devices, can thus provide a high-quality listening experience. The psychoacoustic frequency range extension is achieved by processing audio signals, such as by processing circuitry found in the mobile devices, and without requiring hardware modifications to the speakers. Frequency range extension and frequency response improvement, when achieved without resorting to increasing the amount of physical energy in a suboptimal subband, may also be useful for the improving power consumption characteristics and longevity of the speaker drivers.

Audio Processing System

FIG. 1 is a block diagram of an audio system 100, in accordance with some embodiments. The audio system 100 provides frequency range extension for a speaker 110 using a non-linear filterbank module 120. The system 100 includes the filterbank module 120 including harmonic processing modules 104(1), 104(2), 104(3) and 104(4), an allpass filter network module 122, and a combiner module 106. Some embodiments of the audio system 100 may include components different from those described here.

The filterbank module 120 uses a highly tunable, nonlinearity having a dependence on scale that is subject to constraints to generate phase-coherent harmonic spectra from an audio channel a(t). In some embodiments, the harmonic processing modules 104 may be connected in parallel, as shown. Some embodiments may include a series implementation of the filterbank module, where the residual of each upstream harmonic processing module is passed to a downstream harmonic processing module. A series implementation is discussed in greater detail in connection with FIG. 7. The system 100 generates an output channel o(t) that is provided to the speaker 110 for rendering. The harmonic processing modules 104(1) through 104(4) of the filterbank module 120 provide for psychoacoustic frequency range extension for the audio channel a(t) beyond the physical bandwidth of the speaker 110.

The filterbank module 120 includes multiple harmonic processing modules 104(*n*) that generate harmonic spectral components h(t)(n). In some embodiments, each harmonic processing module 104(1) to 104(4) analyzes the entire audio channel a(t) and synthesizes a respective harmonic spectral component h(t)(1) to h(t)(4). In some embodiments, each harmonic processing module may analyze a different targeted subband of the audio channel. Each harmonic spectral component h(t)(n) is a phase-coherent spectral transformation of the data in a(t). Each harmonic spectral component h(t)(n) has weighted phase-coherent harmonic spectra including frequencies different from the frequencies of data in a respective targeted subband of a(t), and produces the psychoacoustic impression of the frequencies of the respective targeted subband when output by the speaker 110. One or more of the harmonic processing modules 104(*n*) may be selected to generate a harmonic spectral component h(t)(n) to provide psychoacoustic frequency range extension for the speaker 110. In some embodiments, the selection of the targeted subbands may be based on the capabilities of the speaker 110, such as the frequency response of the speaker 110. For example, if the speaker 110 is unable to effectively render low frequencies of sound, then a harmonic processing module 104 may be configured to target a frequency subband component corresponding with the low frequencies, and these may be converted to a harmonic spectral component h(t)(n). The audio system 100 may include one or more harmonic processing modules 104. Additional details regarding a harmonic processing module 104 are discussed in connection with FIGS. 2 through 5.

The allpass filter network module 122 generates a filtered audio channel a(t) to ensure that the audio channel a(t) remains coherent with the output of the filterbank module 120. The allpass filter network 122 compensates for phase changes as a result of the application of harmonic processing modules 104(*n*) by applying a matching phase change to the input signal a(t). This allows for coherent summing to occur between a signal which is perceptually indistinguishable from a(t), but with manipulated phase, and the harmonic spectral components h(t)(n) generated by the filterbank module 120.

The combiner module 106 generates the output channel o(t) by combining the filtered audio channel a(t) from the allpass filter network module 122 and one or more harmonic spectral components h(t)(n) from the filterbank module 120. The combiner module 106 provides the output channel o(t) to the speaker 110. In some embodiments, the combiner module 106 performs additional processing on the summed harmonic spectral components h(t)(n), as discussed in greater detail in connection with FIG. 6.

Figure 2:
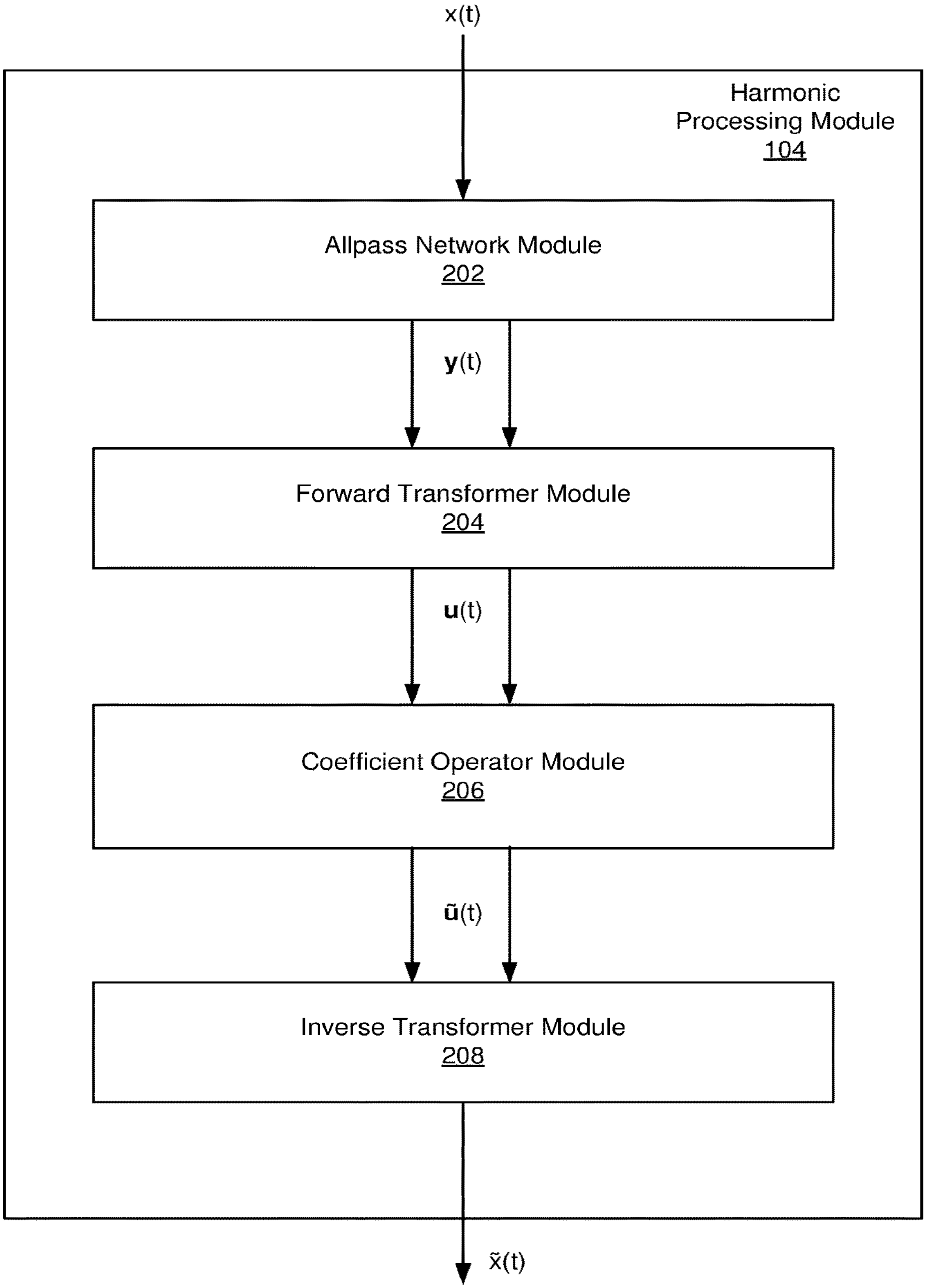
FIG. 2 is a block diagram of a harmonic processing module, in accordance with some embodiments.

FIG. 2 is a block diagram of a harmonic processing module 104, in accordance with some embodiments. The harmonic processing module 104 provides a non-linear filter that analyzes an audio channel and resynthesizes data of a targeted subband with a configurable spectral transformation. The harmonic processing module 104 includes an allpass network module 202, a forward transformer module 204, a coefficient operator module 206, and an inverse transformer module 208. The allpass network module 202 applies a pair of transformations in phase to the audio channel x(t) to generate quadrature components. The forward transformer module 204 applies a forward transformation to the quadrature components that rotates an entire spectrum such that a selected frequency is mapped to 0 Hz to generate rotated spectral quadrature components. The shifting of the selected frequency to 0 Hz is referred to as a change from a standard basis to a rotated basis. The selected frequency may be a center frequency or other frequency of a targeted subband. The coefficient operator module 206 performs operations in the rotated basis, including selectively filtering data based on frequency, magnitude or phase and generating weighted phase-coherent harmonic spectral quadrature components by applying a nonlinearity to the isolated components having a dependence on scale that is subject to constraints. The inverse transformer module 208 applies an inverse transformation to rotate the spectrum of the weighted phase-coherent rotated spectral quadrature components such that 0 Hz is mapped to the selected frequency to generate a harmonic spectral component $\tilde{x}(t)$. The shifting of 0 Hz to the selected frequency is referred to as a change from the rotated basis to the standard basis. The harmonic spectral component $\tilde{x}(t)$ may include different frequencies from the targeted subband of the audio channel x(t) but produces a psychoacoustic impression of the frequencies of the targeted subband of the audio channel x(t) when rendered by a speaker.

In some embodiments, the audio component x(t) input to the harmonic processing module 104 may be a subband component a(t)(n). In this example, the selective filtering by the coefficient operator module 206 to select the targeted frequencies may be skipped.

The allpass network 202 converts an audio channel x(t) to a vector y(t) including quadrature components $y_1(t)$ and $y_2(t)$. The quadrature components $y_1(t)$ and $y_2(t)$ include a 90° phase relationship. The quadrature components $y_1(t)$ and $y_2(t)$ and the input signal x(t) include a unity magnitude relationship for all frequencies. The real-valued input signal x(t) is turned quadrature-valued by a matched pair of allpass filters H1 and H2. This operation may be defined via a continuous-time prototype as shown in Equation 1:

$$\mathcal{H}(x(t)) \equiv [\mathcal{H}(x(t))_1 \quad \mathcal{H}(x(t))_2] \equiv \left[\tilde{x}(t) \quad \frac{1}{\pi}\int_{-\infty}^{\infty}\frac{\tilde{x}(\tau)}{t-\tau}dt\right] \tag{1}$$

Some embodiments will not necessarily guarantee a phase relationship between the input (mono) signal and either of the two (stereo) quadrature components $y_1(t)$ and $y_2(t)$, but results in the quadrature components $y_1(t)$ and $y_2(t)$ including the 90° phase relationship and the quadrature components $y_1(t)$ and $y_2(t)$ and the input signal x(t) including the unity magnitude relationship for all frequencies.

Figure 3:
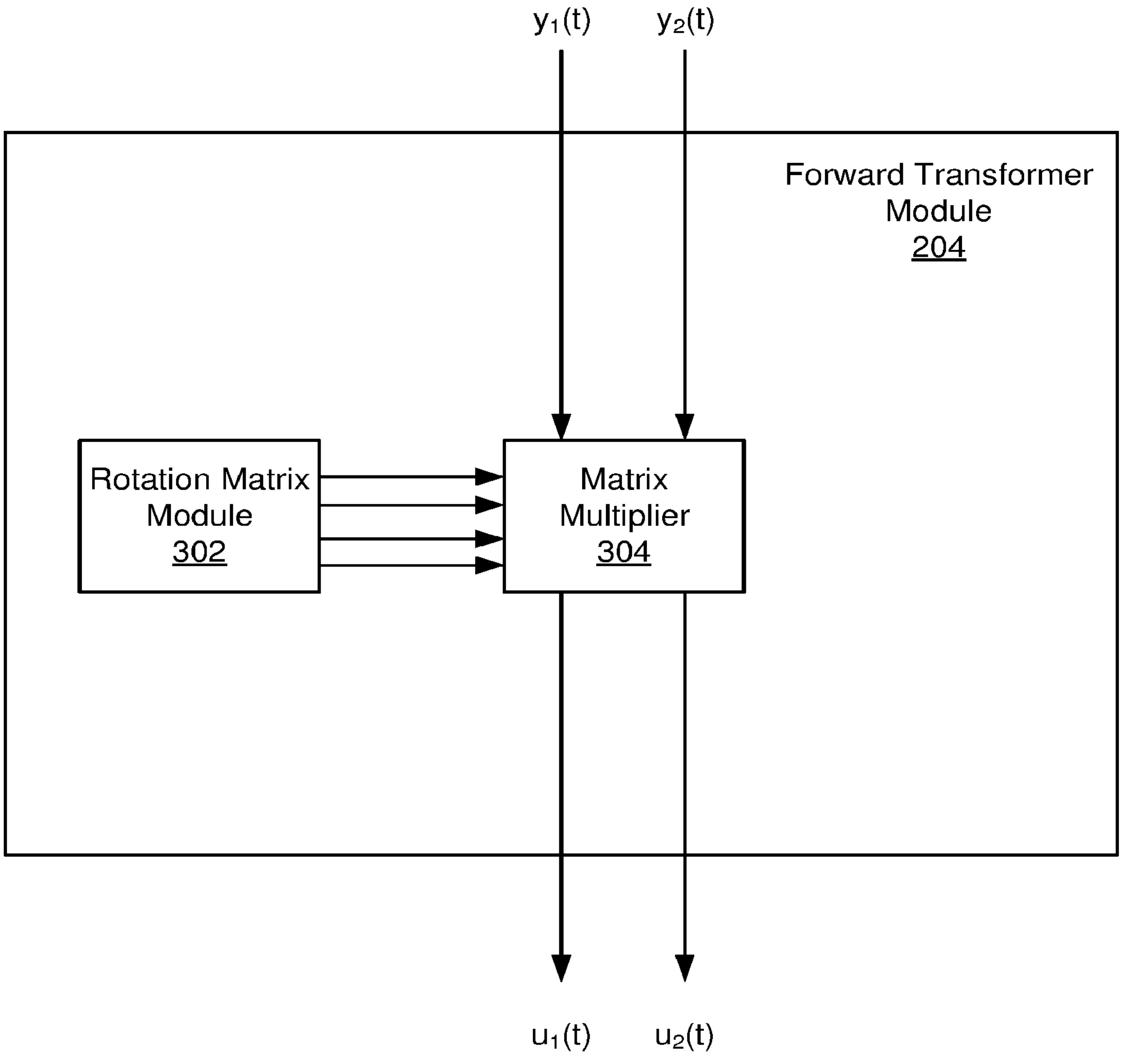
FIG. 3 is a block diagram of a forward transform module, in accordance with some embodiments.

FIG. 3 is a block diagram of the forward transformer module 204, in accordance with some embodiments. The forward transformer module 204 includes a rotation matrix module 302 and a matrix multiplier 304. The forward transformer module 204 receives the quadrature components $y_1(t)$ and $y_2(t)$ and applies a forward transformation to generate a vector u(t) including rotated spectral quadrature components $u_1(t)$ and $u_2(t)$. This transformation is applied by generating a time-varying rotation matrix via the rotation matrix module 302 and applying it to the quadrature components via the matrix multiplier 304, resulting in the rotated spectral quadrature components u(t). The vector u(t) is a frequency shifted form of the spectrum of the audio signal x(t) and defines a coefficient space where each u at a different time t is defined as a rotated spectral quadrature component. The coefficients defined by the vector u(t) are the result of rotating the spectrum of x(t) such that the desired center frequency θc now lies at 0 Hz.

The forward transform may be applied as a time-varying 2-dimensional rotation on a quadrature signal as defined by Equation 2:

$$u[t]=H_1(x[t])R_2(-\theta_c t) \quad (2)$$

where H1 is an allpass filter, the rotation $R_2(-\theta_c t)$ is of an angular frequency θc and defined by Equation 3:

$$R_2(-\theta_c t) \equiv \begin{bmatrix} \cos(-\theta_c t) & -\sin(-\theta_c t) \\ \sin(-\theta_c t) & \cos(-\theta_c t) \end{bmatrix} \quad (3)$$

Equations 2 and 3 include iterative calls to trigonometry functions. Over an interval where θc is constant, the forward transformation may be calculated by recursive 2D rotations rather than the iterated calls to trigonometry functions. When this optimization strategy is used, the calls to sin and cos are only made when θc is initialized or changed. This optimization recursively defines each matrix $R_2(-\theta_c t)$ as successive powers of an infinitesimal rotation matrix, i.e.: $R_2(-\theta_c(t+1)) \equiv R_2(-\theta_c t)R_2(-\theta_c)$. Since multiplying two 2-by-2 matrices together is a highly optimized calculation on most architectures, this definition may offer performance advantages over the iterated calls to trigonometry functions presented in Equation 3, which is nonetheless equivalent.

Figure 4:
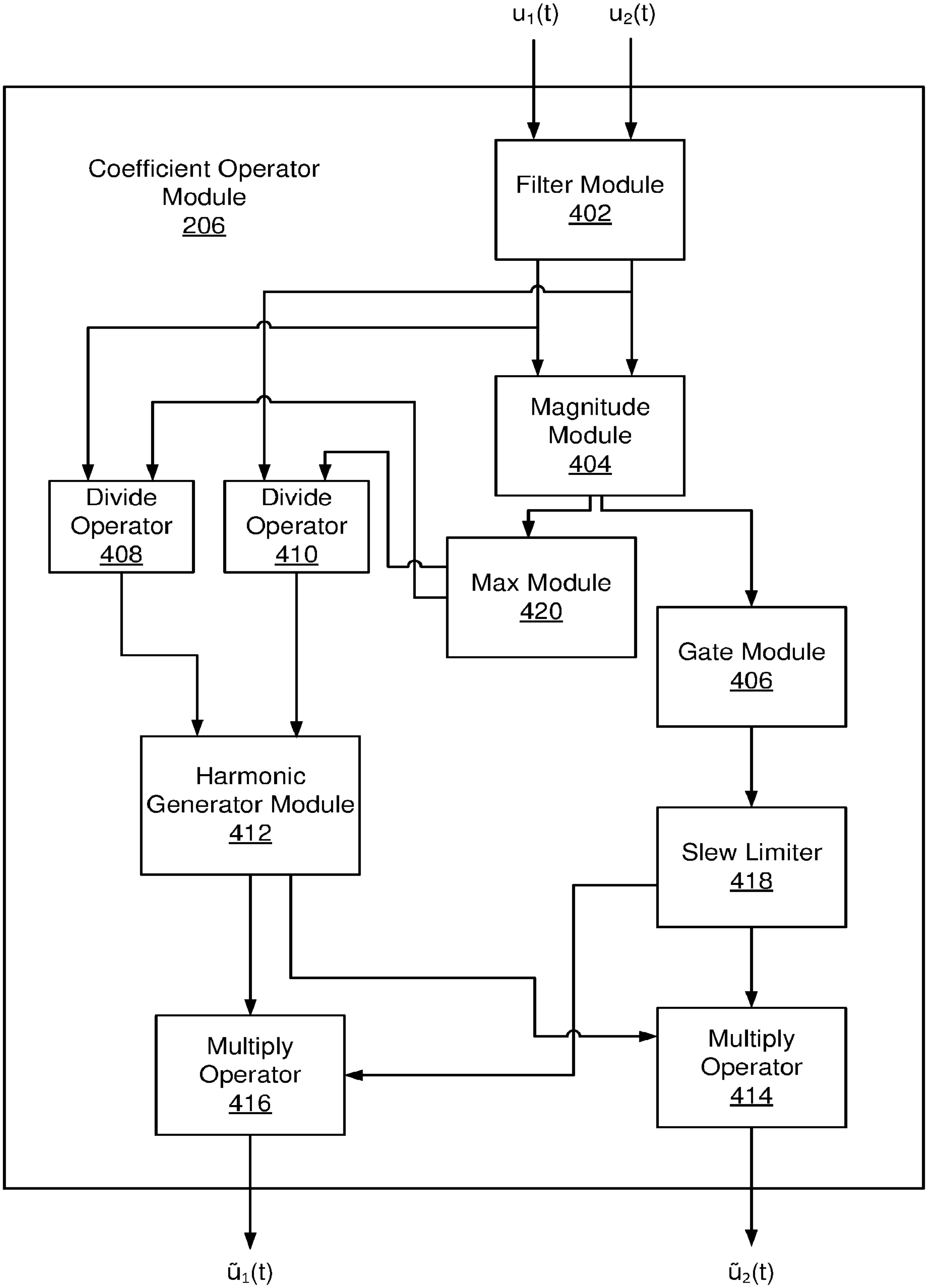
FIG. 4 is a block diagram of a coefficient operator module, in accordance with some embodiments.

FIG. 4 is a block diagram of the coefficient operator module 206, in accordance with some embodiments. The coefficient operator module 206 includes a filter module 402, a magnitude module 404, a gate module 406, divide operators 408 and 410, a harmonic generator module 412, multiply operators 414 and 416, and a max module 420. The coefficient operator module 206 generates a rotated spectrum u(t) including the weighted phase-coherent rotated spectral quadrature components $\tilde{u}_1(t)$ and $\tilde{u}_2(t)$ using the vector u(t) including the rotated spectral quadrature components $u_1(t)$ and $u_2(t)$.

In some embodiments, the filter module 402 is a two channel low-pass filter. In this case, the harmonic processing module 104 is configured to perform spectral transformations on a targeted subband centered at θc, at a bandwidth which is double the cutoff frequency of the filter module 402. The filter module 402 may apply a lowpass filter F(x) that results in a tunable bandpass filter after the inverse transformation. In this case, the cutoff frequency of F(x) corresponds to half the bandwidth of the nonlinear filter's analysis region.

The magnitude module 404 determines the length of the 2D vector, which is used as a measure of instantaneous magnitude, which may be selectively factored out of the filtered signal vector, using the divide operators 408 and 410. For example, the divide operator 408 may perform division for the $u_1(t)$ component of u(t) and the divide operator 410 perform division for the $u_2(t)$ component of u(t). The constraint on scale independence, as defined by max( ) function in Equation 9, is applied by the max module 420, which effectively constrains the action of the divide operators 408 and 410. In some embodiments, the magnitude may be factored out regardless of scale in order to allow the harmonic generator module 412 to provide harmonics based on the signal whose relationships are not dependent on scale.

The harmonic generator module 412 generates a nonlinearity that includes a sum of weighted constituent nonlinearities. The nonlinearity provides a harmonic spectrum based on the targeted subband of the rotated spectral quadrature components. For example, the harmonic generator module 412 generates constituent nonlinearities of different harmonics, applies weights $a_n$ to constituent nonlinearities, and generates the nonlinearity as a sum of the weighted constituent nonlinearities.

The magnitude provided by the magnitude module 404 is then used again, this time passed through the gate module 406. The gate module 406 generates an envelope whose instantaneous slope is limited by the slew limiter 418. The resulting slew limited envelope is then applied to the output of the harmonic generator module 412 via the multiply operators 414 and 416. For example, the multiply operator 416 may perform multiplication for the $u_1(t)$ component of u(t) and the multiply operator 414 may perform multiplication for the $u_2(t)$ component of u(t). The nonlinearity, defined by a sum of the weighted harmonics, is multiplied with the time-varying envelope to generate the rotated spectrum ũ(t).

The coefficients of u(t) may be expressed in polar coordinates using Equation 4:

$$\|u[t]\|=\sqrt{u_1[t]^2+u_2[t]^2}$$

$$\angle u[t]=\operatorname{atan2}(u_1[t],u_2[t]) \quad (4)$$

where the term ||u(t)|| is the instantaneous magnitude of the coefficient signal, and ∠u(t) is the instantaneous phase. These terms can now be manipulated prior to the inverse transformation stage.

The coefficients defined by u(t) are selectively filtered based on their instantaneous magnitude. The filtering may include a gate function applied by the gate module 406 and a slew limiting filter applied by the slew limiter 418. The gate function based on a threshold n may be defined by Equation 5:

$$\mathcal{G}(x) = \begin{cases} 1, & \text{if } x \geq n \\ 0, & \text{if } x < n \end{cases} \quad (5)$$

where the case x≥n results in keeping the coefficient and the case x<n results in removal of the coefficient. In some embodiments, the case x<n may alternately result in an attenuation rather than complete removal of the coefficient. Because the gate function operates on an estimate of instantaneous magnitude, it is in general more responsive than gates based on real-valued amplitude, while having fewer artifacts.

Time-domain smoothing may be achieved via the slew limiting filter, to further tailor the envelope characteristics of the nonlinear filter's response. A slew limiting filter is a nonlinear filter which saturates the maximum (positive) and minimum (negative) slope of a function. Various types of slew limiting filters or elements may be used, such as a nonlinear filter with independent control over positive and negative saturation points, notated below as S(x). Applying slew limiting to the output of the gate function results in a time-varying envelope: S (G (||u[t]||)). This may be used to sculpt the envelope of the coefficients.

To generate phase-coherent harmonic spectrum of ũ(t), the harmonic generator module 412 may use the Chebyshev polynomial of the first kind as defined by Equation 6:

$$T_n(x)=\cos(n\cos^{-1}(x)) \tag{6}$$

These polynomials afford the controlled generation of harmonics by summing their outputs, as defined by Equations 7 or 8 for scale-independent nonlinearity:

$$\tilde{u}_1[t] = \mathcal{S}(\mathcal{G}(\|\mathcal{F}(u[t])\|))\sum_{n=0}^{N}(a_n T_n(\mathcal{F}(\cos(\angle u[t])))) \tag{7}$$

$$\tilde{u}_2[t] = \mathcal{S}(\mathcal{G}(\|\mathcal{F}(u[t])\|))\sum_{n=0}^{N}(a_n T_n(\mathcal{F}(\sin(\angle u[t]))))$$

Or, equivalently:

$$\tilde{u}[t] = \mathcal{S}(\mathcal{G}(\|\mathcal{F}(u[t])\|))\sum_{n=0}^{N}\left(a_n T_n\left(\mathcal{F}\left(\frac{u[t]}{\|u[t]\|}\right)\right)\right) \tag{8}$$

where $a_n$=[a0, a1, a2 . . . aN] are the harmonic weights applied to each harmonic n of the phase-coherent harmonic spectrum and N is the highest generated harmonic. In both representations of Equations 7 and 8, the nonlinearity (e.g., defined by the summation result) is independent of the input scale. This prevents the output spectrum from varying with the input loudness, and instead allows only variations determined by the spectral weights a. The weights are generally arranged as a decaying series, emulating the harmonic series of naturally-occurring sounds, to which the human auditory system is accustomed. The series of weights are independent of the scale of the incoming audio channel.

Though equivalent, Equation 7 has the benefit of allowing for the direct manipulation of output phase, whereas Equation 8 omits potentially expensive trigonometric functions, operating only on magnitude.

In Equations 7 and 8, the output spectrum of the nonlinearity does not vary as a function of the input coefficient magnitude ||u(t)||. While this results in a tightly controlled and predictable nonlinearity, this uniformity can generate textures that in some cases sound unnatural. This uncanny effect is especially apparent on certain input content, like spoken and sung vocals, and it is exacerbated if low-frequency content is also present.

For example, cinematic content may often employ low-frequency effects (LFE) content simultaneously with dialog. This LFE content is precisely the type of content we would like to reproduce using the technique, however the resulting intermodulation distortion can impact the intelligibility and realism of the voice.

To address this, varying degrees of control may be applied to each constituent nonlinearity of the nonlinearity, allowing for the resulting harmonic mixture to be (e.g., somewhat) animated in response to input content. The degree to which the incoming magnitude is clipped to unity will determine the degree of spectral stability. At magnitudes below unity, the harmonic contribution of the constituent nonlinearity will include a mixture of lower integer harmonics. While even polynomials will generate mixtures of even-numbered integer harmonics, odd polynomials will generate mixtures of odd-numbered integer harmonics.

Since the instantaneous magnitude calculation is directly applied in Equation 8, we can simply modify the algorithm to apply constraints to its application as defined by Equation 9:

$$\tilde{u}[t] = \mathcal{S}(\mathcal{G}(\|\mathcal{F}(u[t])\|))\sum_{n=0}^{N}\left(a_n T_n\left(\mathcal{F}\left(\frac{u[t]}{\max(\|u[t]\|, b_n)}\right)\right)\right) \tag{9}$$

where $b_n$=[b0, b1, b2 . . . bN] defines a minimum value constraint for the magnitude-correction factor defined by max(||u(t)||, $b_n$) for each harmonic n of the phase-coherent harmonic spectrum and N is the highest generated harmonic. For each harmonic n, the magnitude correction factor max (||u(t)||, $b_n$) defines a constraint on a gain correction applied to an input u(t) of a constituent nonlinearity as defined by Equation 10:

$$T_n\left(\mathcal{F}\left(\frac{u[t]}{\max(\|u[t]\|, b_n)}\right)\right) \tag{10}$$

As such, the nonlinearity as defined by Equation 11:

$$\sum_{n=0}^{N}\left(a_n T_n\left(\mathcal{F}\left(\frac{u[t]}{\max(\|u[t]\|, b_n)}\right)\right)\right)$$

includes weighted (e.g., by $a_n$) mixture of the constituent nonlinearities for different harmonics (n=0 through N), where the constituent nonlinearities are defined by Equation 10.

For magnitudes of u(t) below $b_n$, the signal magnitude used for correction is permitted to fluctuate. For magnitudes of u(t) above $b_n$, the harmonic content is defined as the sum of the harmonics corresponding to the order of the polynomial, as is the case for all possible magnitudes in Equation 8. At magnitudes of u(t) between b and 0, the upper harmonic content roughly decreases as magnitudes diminish, however for high-order polynomial mixtures, the relationship may be more complex than simply monotonic.

For example, a transfer function including the third Chebyshev polynomial as defined by Equation 12:

$$T_3(x)=4x^3-3x \tag{12}$$

results in the following pure third harmonic (and −∞ dB of the 1st) when x is a unit-magnitude cosine wave, as defined by Equation 13:

$$T_3(\cos(x))=\cos(3x) \tag{13}$$

but will result in a mixture of harmonics when x is instead a cosine wave at −6 dB magnitude, as defined by Equation 14:

$$T_3\left(\frac{\cos(x)}{2}\right) = \frac{\cos(3x)}{8} - \frac{9\cos(x)}{8} \tag{14}$$

or colloquially, −18 dB of the third harmonic and +1 dB of the first (the fundamental) harmonic. This mixture also demonstrates the oddness of all constituent resulting harmonics. Furthermore, the first harmonic has been amplified relative to the input, resulting in a positive dB value.

The same transfer function when applied to a cosine wave at −12 dB creates a result as defined by Equation 15:

$$T_3\left(\frac{\cos(x)}{4}\right)=\frac{\cos(3x)}{64}-\frac{45\cos(x)}{64} \tag{15}$$

which includes a diminishing third harmonic and non-monotonic behavior of the first harmonic.

By constraining the degree of spectral clipping, the algorithm may generalize better across content. Furthermore, potentially fewer bands may need to be calculated, since any intermodulation effects are less perceptually present.

Intermodulation effects are a typical byproduct of the application of a nonlinear transfer function onto signals with more than one frequency. Typically, these intermodulation effects include frequencies which are sums and differences of the input signal frequencies. In the unconstrained case, these intermodulation effects are given additional weight and stability. By constraining the spectral clipping function, the resulting spectrum is less stable, and more heavily emphasizes the dominant frequencies over the intermodulation effects.

As a result, extending frequency range via constrained spectral clipping may use fewer individual nonlinear filters than one using an unconstrained method, to achieve an analogous effect. This may result in an increase in computational efficiency. Furthermore, the parameter reduction may also result in an algorithm which is more straightforward to tune, since interactions between many filters can sometimes be difficult to manage.

As shown in Equation 14, the treatment of the 3rd Chebyshev polynomial applied to a cosine of magnitude −6 dB may result in an amplification, rather than being relegated to attenuations. This fact, paired with the relatively unintuitive behavior of mixtures of harmonics, may cause clipping if care is not taken to avoid it. In some embodiments, an odd nonlinearity may be applied to the harmonic spectral components generated by the filterbank module 120 to manage this resulting dynamic, as discussed in greater detail in connection with FIG. 6.

Figure 5:
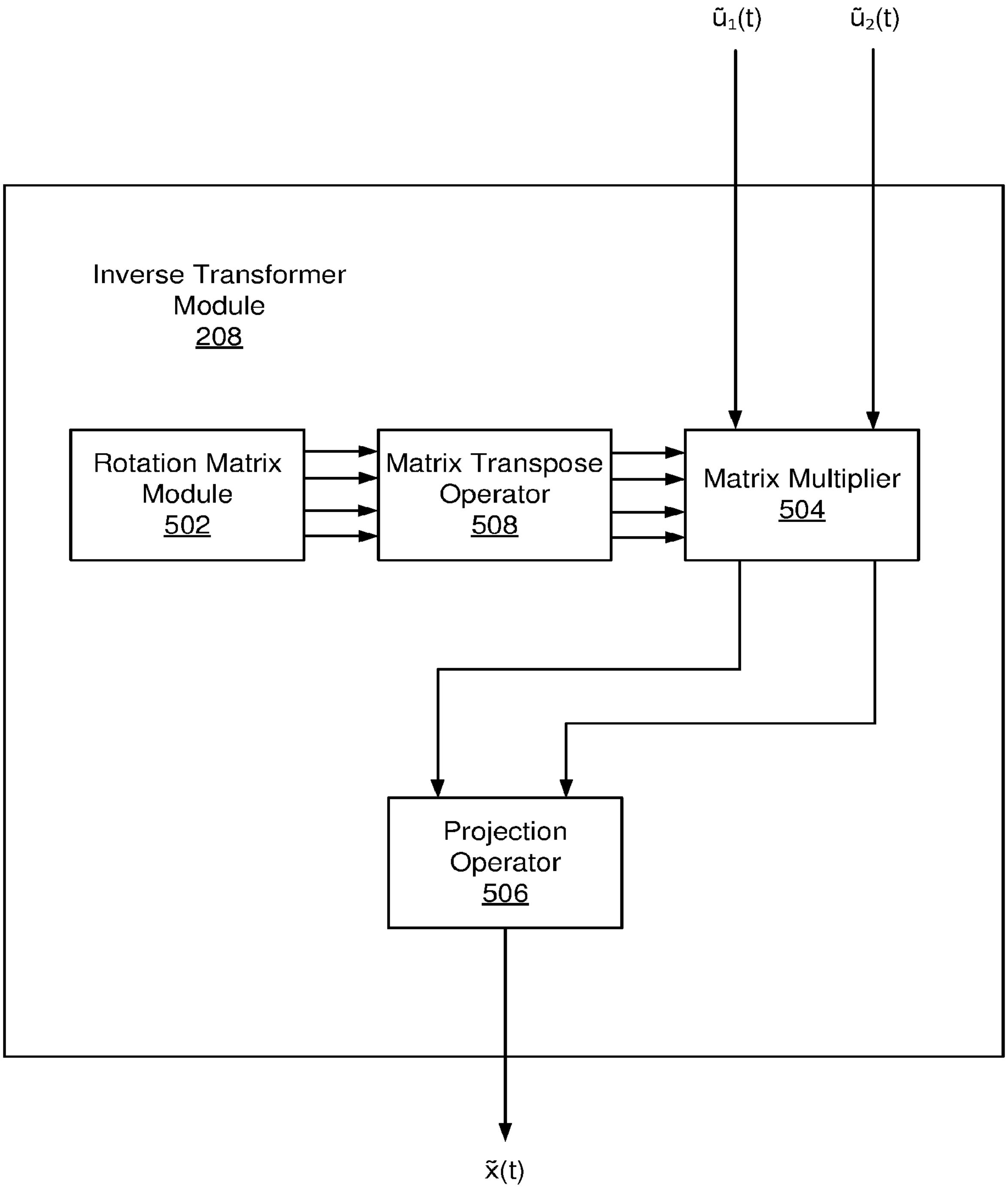
FIG. 5 is a block diagram of an inverse transform module, in accordance with some embodiments.

FIG. 5 is a block diagram of the inverse transformer module 208, in accordance with some embodiments. The inverse transformer module 208 includes a rotation matrix module 502, a matrix multiplier 504, a projection operator 506, and a matrix transpose operator 508. The inverse transformer module 208 generates a harmonic spectral component $\tilde{x}(t)$ from the rotated spectrum $\tilde{u}(t)$ including the phase-coherent rotated spectral quadrature components $\tilde{u}_1(t)$ and $\tilde{u}_2(t)$. The rotation matrix module 502 generates a rotation matrix that is identical to the rotation matrix generated by the matrix module 302. The matrix generated by the rotation matrix module 502 is transposed by the matrix transposition operator 508 and applied to the incoming 2D vector of the phase-coherent rotated spectral quadrature components $\tilde{u}_1(t)$ and $\tilde{u}_2(t)$ by the matrix multiplier 504. The resulting 2D vector is projected to a single dimension by the projection operator 506.

To perform the inverse transformation from the rotated basis back into the standard basis, the output spectrum is shifted so that 0 Hz returns to its original location θc as defined by Equation 16:

$$\tilde{x}[t]=\tilde{u}[t]R_2(\theta_c t)P \tag{16}$$

where P is a projection from the two-dimensional real coefficient space to a single dimension as defined by Equation 17:

$$P=\begin{bmatrix}1\\0\end{bmatrix} \tag{17}$$

Because the forward transform $R_2(-\theta_c t)$ includes orthonormal rotations, the inverse transform is the transpose. This algebraic structure permits caching of the forward transformation matrix and inverting it simply by changing the order in which the coefficients are multiplied. It is in this sense that the rotation matrix module 302 in FIG. 3 and the rotation matrix module 502 in FIG. 5 are said to be identical. The harmonic spectral component $\tilde{x}(t)$ is an example of a harmonic spectral component h(t)(n), and thus may be the response of a nonlinear filter in a larger filterbank.

Figure 6:
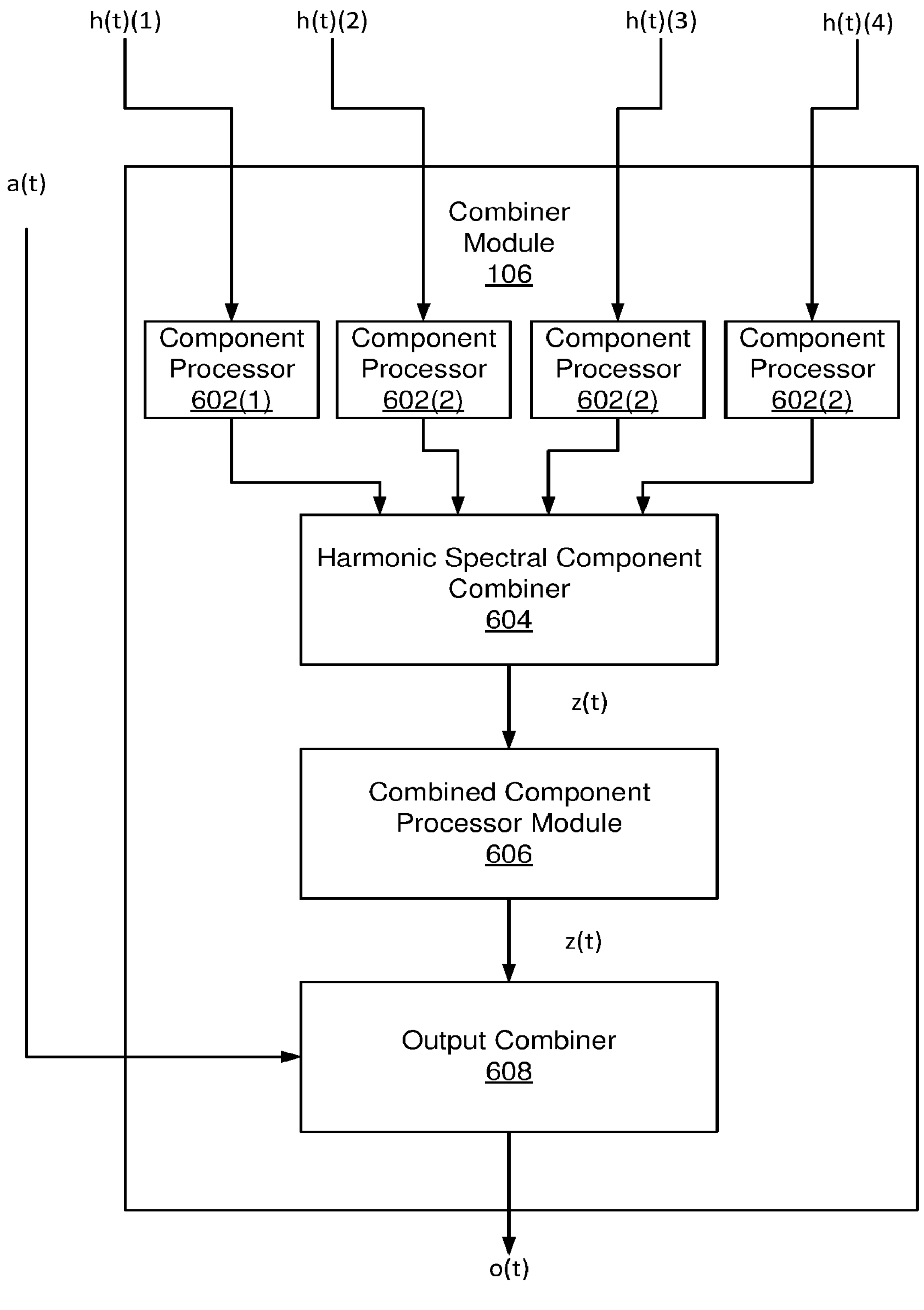
FIG. 6 is a block diagram of a combiner module, in accordance with some embodiments.

FIG. 6 is a block diagram of the combiner module 106, in accordance with some embodiments. The combiner module 106 performs further processing on the harmonic spectral components h(t)(n) from the filterbank module 120, combines the harmonic spectral components h(t)(n) to generate a combined component z(t), performs further processing on the combined component z(t), and combines the combined component z(t) with the filtered audio channel a(t) from the allpass filter network module 122 to generate the output channel o(t).

The combiner module 106 includes component processors 602(1) through 602(4) (individually referred to as component processor 602 or **602(*n*)), a harmonic spectral component combiner 604, a combined component processor 606, and an output combiner 608. The component processors 602(1) through 602(4) respectively apply processing to the harmonic spectral components h(t)(1) through h(t)(n). The combiner module 106 may include a component processor 602 for each harmonic processing module 104 of the filterbank module 120. As discussed above, the filterbank module 120** may selectively generate one or more of the harmonic spectral components h(t)(n), with each harmonic spectral components h(t)(n) being generated using a different frequency band n of the audio channel a(t).

For the constrained nonlinearity as defined in Equation 10, the greater variability of the output levels that may result suggest something more may be done to limit momentary peak levels. Following the creation of a harmonic spectral component h(t)(n) (or $\tilde{x}(t)$ as defined by Equation 16), the component processor **602(*n*)** applies a nonlinearity to the signal which constrains it to the range (−1,1). This nonlinearity may be an odd linearity, such as a sigmoid function. This nonlinearity may in general preserve sign, and gently slope toward either extremum of the range. The hyperbolic tangent, with a scaling factor q, is one example for such a function, as defined by Equation 18:

$$\tilde{\tilde{x}}[t]=\frac{\tanh(\varsigma\tilde{x}[t]}{\tanh(\varsigma)} \tag{18}$$

When employed to reduce peaks, this nonlinearity may also add odd harmonics to the harmonic spectral component h(t)(n). These odd harmonics will be in phase with the harmonics of the harmonic spectral component h(t)(n). The odd harmonics at this stage will shift changes in overall amplitude into changes in timbre, in a manner respectful of common human auditory cues for loudness.

When combined with a peak limiter, the peak limiting threshold may be set a small amount below the threshold in Equation 18, so that the harmonic character of the limiting function is dominated by the more perceptually meaningful hyperbolic tangent rather than the sharp corners of a peak limiter.

In some embodiments, one or more of the component processors 602(*n*) may attenuate (e.g., with independent tuning) their respective harmonic spectral component h(t)(n) to achieve desired nonlinear characteristics for the combined component z(t).

The harmonic spectral component combiner 604 combines the harmonic spectral components h(t)(n), such as the harmonic spectral components h(t)(1) through h(t)(n), to generate the combined component z(t).

The combined component processing module 606 processes the combined component z(t). The combined component processing module 606 may also apply various types of processing, such as high-pass filtering, dynamic range processing (e.g., limiting or compression), etc.

The output combiner 608 combines the combined component z(t) with the filtered audio channel a(t) from the allpass filter network module 122 to generate the output channel o(t). In some embodiments, the output combiner 608 may attenuate the filtered audio channel a(t) or the combined component z(t) prior to the combination.

Figure 7:
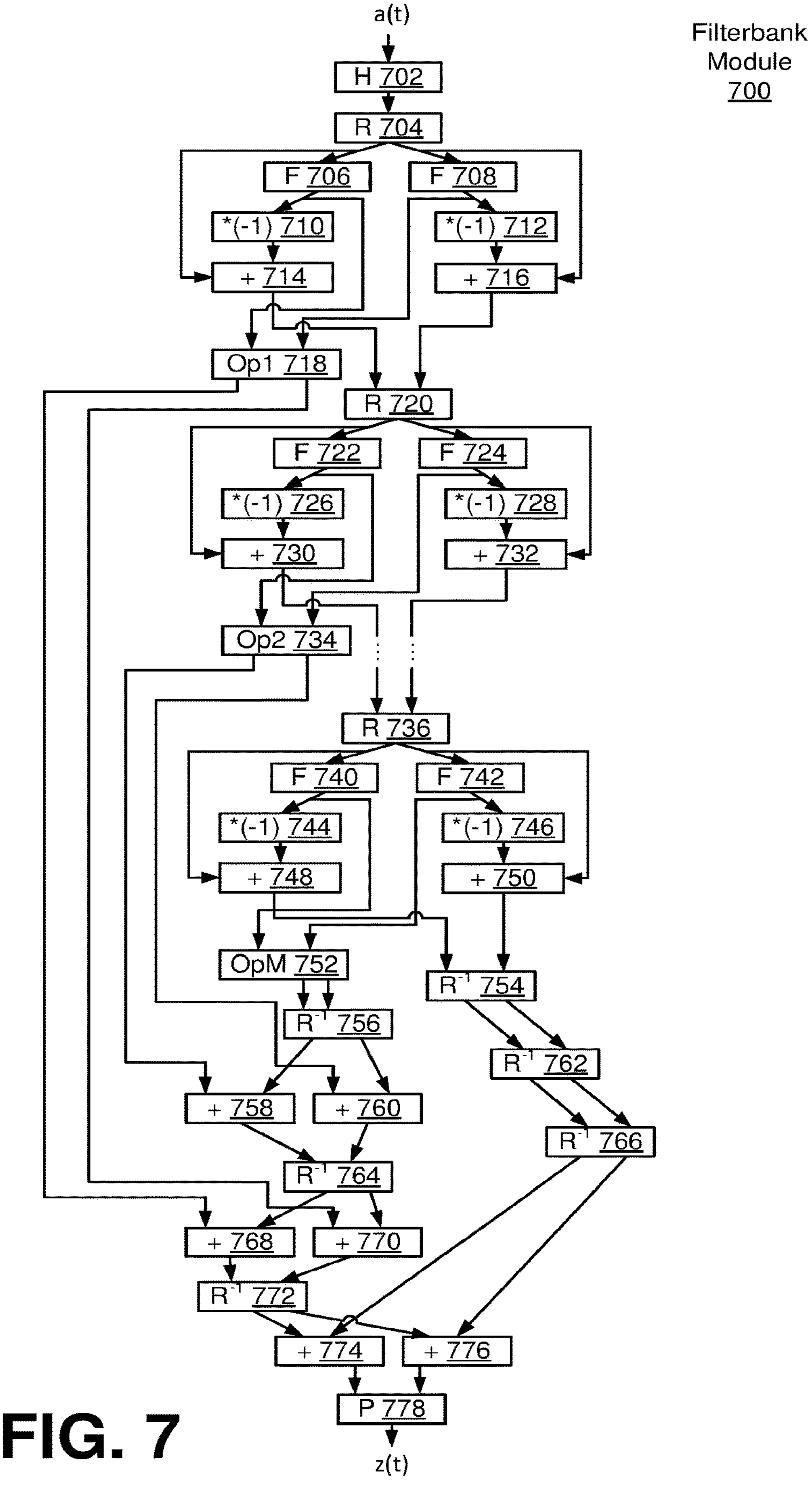
FIG. 7 is a block diagram of a filterbank module, in accordance with some embodiments.

FIG. 7 is a block diagram of a filterbank module 700, in accordance with some embodiments. The filterbank module 700 is an embodiment of the filterbank module 120. The filterbank module 700 uses a series implementation where each downstream harmonic spectral component is generated using as an input a residual of an upstream harmonic spectral component. Although the construction of the filterbank module with independent filters applied in parallel is relatively intuitive, tuning such a filterbank module can be a complicated task. This difficulty is the result of the loss of power spectrum conservation. In practice, filterbank tunings with problematic power spectrum conservation often give the impression of a short delay or comb filter in the low frequencies, disrupting the listener's ability to determine timing. This happens because the envelopes of percussive low frequency content often drop in both amplitude and fundamental frequency simultaneously. Thus, discontinuities in power spectrum result in the perception of multiple transients, where only one existed prior.

In a series paradigm, each filter of the filterbank module 700 bifurcates the signal between a band over which to analyze, and the residual of the incoming content. This is done by replacing the lowpass filter F(x) with a 2-band crossover network. Note that, in some cases, this may be accomplished simply by subtracting the lowpass signal from the broadband signal immediately before the lowpass operation. Subsequent filters then operate only on the residual highpassed signal, leaving out spectral data which was previously acted upon by upstream filters. As a result, the total spectral energy analyzed by the filterbank module 700 is identical to the total spectral energy at the input.

Just as in the parallel case, each serial filter uses an independent forward and inverse transformation. This can be accomplished in a number of ways. In a first example, each filter's forward and inverse transformations are applied before moving to the downstream filter's forward and inverse transformation, and so on. In a second example, a pyramid algorithm is used in which the coordinates for the subsequent filters' forward transforms are transformed, which includes calculating the transformation matrices using the differences between the upstream filter's frequency shift θcn−1 and that of the next θcn. After all forward transformations are applied, the inverse transformations may be applied in the reverse order, starting with the most downstream filter and moving up the series. This allows the caching of frequency deltas between forward and inverse steps.

The filterbank module 700 uses the pyramid algorithm of forward and inverse transformations. In this example, there are N subbands of an audio channel a(t) that are processed in series, from subband 1 to subband N. The blocks op1 718, op2 734, and opM 752 perform coefficient operations on the first, second, and Nth subband respectively. Each of the op1 718, op2 734, and opM 752 may perform coefficient operations as discussed herein for the coefficient operator module 206.

The blocks R 704, R720, and R736 each perform multiplication of a 2-dimensional signal on the right with a time-varying rotation matrix $R_2$, as discussed herein for the rotation matrix module 302. The block H 702 denotes a quadrature filter operation described in Equation 1, with blocks H and R together performing the operation defined by Equation 2.

The blocks F 706, F 708, F 722, F724, F740, and F742 each perform a lowpass filter operation F(x), such as discussed herein for the filter module 402.

The blocks *(−1) 710, *(−1) 712, *(−1) 726, *(−1) 728, *(−1) 744, and *(−1) 746 inverts the received input. The blocks +714, +716, +730, +732, +748, +750, +774, and +776 combine received inputs to generate an output.

The blocks $R^{-1}$ 754, $R^{-1}$ 756, $R^{-1}$ 762, $R^{-1}$ 766, $R^{-1}$ 764, and $R^{-1}$ 772 perform inverse transforms of the R blocks. For example, the blocks R 704, and $R^{-1}$, 772 and $R^{-1}$ 766 uses a rotation of −(θc1t). The blocks R 720, and $R^{-1}$, 764 and $R^{-1}$ 762 uses a rotation of −(θc2−θc1)t. The blocks R 736, and $R^{-1}$, 754 and $R^{-1}$ 756 uses a rotation of −(θcN−θc(N−1))t.

The block P 778 performs the 1-dimensional projection operation described in Equation 17.

Note the use of the differences between adjacent values of θcn, rather than the angular frequency θc. For certain choices of θcn, the pyramid algorithm may afford a more computationally efficient implementation, by limiting the number of times the rotation $R_2(-\theta_c t)$ is calculated. An especially computationally efficient choice for θcn distribution would be linear (wherein the difference between θc for adjacent filters is held constant), thus completely minimizing recalculation of $R_2(-\theta_c t)$, because the matrices would be identical to each other.

The final residual contains the data that is unaffected by the entire filterbank, eliminating the possibility of constructive or destructive interference between the affected and unaffected signals. The transfer function of this residual signal will perfectly dovetail the filterbank analysis regions. This does not necessarily imply a perfect reconstruction of the output signal's power spectrum, since the coefficient operations will likely result in the modification of dynamic behavior or the synthesis of entirely new content. In many cases, this final residual can be discarded altogether, and the output of H 702 may be used to blend the unaffected content back into the final summation.

The filterbank module 700 generates each downstream harmonic spectral component using as an input a residual of an upstream harmonic spectral component. The filterbank topology, containing M total nonlinear filters, can be described as a series architecture in this case. As such, the nonlinear filters may be defined by an index m, having values from 1 to M. For example, the blocks +714 and +716 outputs a residual of the first harmonic spectral component (e.g., m=1), which is used to generate the second harmonic spectral component (e.g., m=2). Here, the residual of the first harmonic spectral component refers to the portion of the audio channel that was filtered out by the blocks F 706 and F 708 and thus were not processed by the block Op1 718. These residual portions are generated by inverting the filtered portions by the blocks *(−1) 710 and *(−1) 712 and adding the inverted filtered portions with the filtered portions by the blocks +714 and +716. The further downstream processing works in a similar fashion. For example, the blocks +730 and +732 outputs a residual of the second harmonic spectral component, which is used to generate the third harmonic spectral component (e.g., m=3), and so forth.

Example Processes

Figure 8:
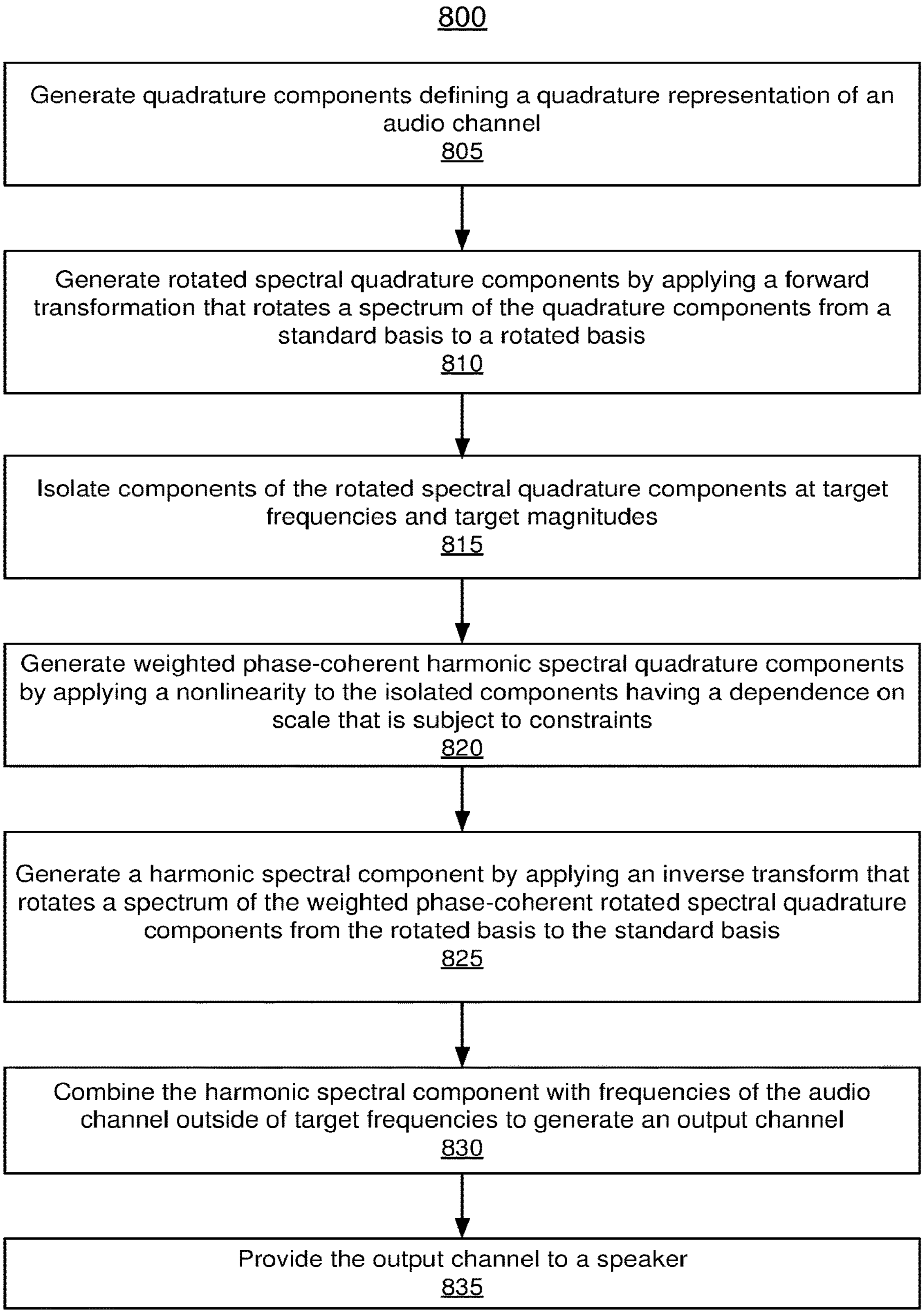
FIG. 8 is a flowchart of a process for psychoacoustic frequency range extension, in accordance with some embodiments.

FIG. 8 is a flowchart of a process 800 for psychoacoustic frequency range extension, in accordance with some embodiments. The process shown in FIG. 8 may be performed by components of an audio system (e.g., audio system 100). Other entities may perform some or all of the steps in FIG. 8 in other embodiments. Embodiments may include different and/or additional steps, or perform the steps in different orders.

The audio system generates 805 quadrature components defining a quadrature representation of an audio channel. The audio channel may be a channel of a multi-channel audio signal, such as a left channel or a right channel of a stereo audio signal. The quadrature components include a 90° phase relationship. The quadrature components and the audio channel include a unity magnitude relationship for all frequencies. In some embodiments, the real-valued input signal is turned quadrature-valued by a matched pair of allpass filters.

The audio system generates 810 rotated spectral quadrature components by applying a forward transformation that rotates a spectrum (e.g., an entire spectrum) of the quadrature components from a standard basis to a rotated basis. The standard basis refers to the frequencies of the input audio channel before the rotation. The rotation may result in a targeted frequency being mapped to 0 Hz. This targeted frequency may be the center of the analysis region of the harmonic processing module, such as the center frequency of a targeted subband for psychoacoustic range extension. The forward transform may be calculated using iterated calls to trigonometry functions as defined by Equation 3 or using an equivalent recursive 2D rotation The audio system isolates 815 components of the rotated spectral quadrature components at target frequencies and target magnitudes. Isolating the components may be performed in the rotated basis. For example, the target frequencies may be isolated using a filter F(x), where x includes components defined by u(t). In some embodiments, the filter removes frequencies above a threshold, and this has the effect of isolating a targeted subband, spanning twice the threshold, symmetrically about the center frequency θc to which the forward transformation was tuned. In some embodiments, the audio system determines the target frequencies based on factors such as a reproducible range of the speaker, reduction of power consumption of the speaker, or increased longevity of the speaker.

The audio system may also isolate components at target magnitudes from the rotated spectral quadrature components, such as by using a gate function. The gate function can either be configured to discard unwanted information in the subband, or to preserve the amplitude envelope. The gate function may further include a slew limiting filter or similar smoothing function.

The audio system generates 820 weighted phase-coherent harmonic spectral quadrature components by applying a nonlinearity to the isolated components having a dependence on scale that is subject to constraints. The weighted phase-coherent rotated spectral quadrature components may be generated in the rotated basis. This rotated basis is well-suited for the generation of designer spectra because it represents a standard-basis signal as a 2-dimensional vector, and because it centers the target frequency about zero. The vector can then be further decomposed into polar coordinates as seen in Equation 4, which are analogous to computing the magnitude and argument of a single bin in a short-time Fourier transform (STFT), a natural descriptor of the information about a particular frequency. This implementation has several distinct advantages over STFT representations. The first is that bin information is calculated only as needed, rather than for an entire spectrum. Another advantage is that results are calculated at a temporal resolution required for the proper representation of transient data. Furthermore, the filter, operating analogously to the window function in STFT techniques, is handily tuned for the purpose of separating targeted spectral content from its residue, and, in the case of multiple harmonic processing modules, may have nonuniform tunings.

The nonlinearity, whose function is primarily to generate phase-coherent spectra given the phase information in the rotated spectral quadrature component, may have a dependence on scale that is subject to constraints as defined by Equation 11. The nonlinearity includes a weighted mixture of constituent nonlinearities, each constituent nonlinearity defined by Equation 10 and corresponding with different harmonic n. Application of the nonlinearity to the isolated components is defined by Equation 9. For each harmonic n, the magnitude correction factor $\max(\|u(t)\|, b_n)$ defines a constraint on a gain correction applied to an input u(t) of a constituent nonlinearity. The scale refers to the magnitude of the input components u(t), as defined by $\|u(t)\|$, representing the energy present in the signal at time t. Different harmonics n may include different minimum value constraints $b_n$. For example, lower harmonics (e.g., fundamental n=1) may be unconstrained (e.g., $b_n=0$), while higher harmonics may be more constrained with higher values of $b_n$.

The nonlinearity itself may include a weighted summation of Chebyshev polynomials of the first kind with magnitudes being selectively factored out subject to the constraints. Each constituent nonlinearity of the nonlinearity may be weighted by a predefined harmonic weight $a_n$, as defined by Equation 9.

The audio system generates 625 a harmonic spectral component by applying an inverse transform that rotates a spectrum of the weighted phase-coherent rotated spectral quadrature components from the rotated basis to the standard basis. The inverse transform may rotate the spectrum such that 0 Hz is mapped to the target frequency. The harmonic spectral component includes frequencies different from the targeted frequencies, but produces a psychoacoustic impression of the targeted frequencies when rendered by the speaker. The frequencies of the harmonic spectral component may be within the bandwidth of the speaker while the subband frequencies may be outside of the bandwidth of the speaker. In some embodiments, the subband frequencies are lower than the frequencies of the harmonic spectral component. In some embodiments, the subband frequencies include a frequency between 18 Hz and 250 Hz. In some embodiments, the targeted subband or frequencies may be within the reproducible range of the speaker, but may have been chosen for application-specific reasons, for example, to reduce power consumption of the audio system or to improve the longevity of the speaker.

The audio system combines 830 the harmonic spectral component with frequencies of the audio channel outside of target frequencies to generate an output channel and provides 835 the output channel to the speaker. In some embodiments, the audio system generates the output channel by combining the harmonic spectral component with the original audio channel, and provides the output channel to the speaker. In some embodiments, the audio system filters the audio channel or other subband components of the audio channel (e.g., excluding the subband component(s) used for frequency range extension) to ensure that the audio channel or other subband components remains coherent with harmonic spectral component, and combines the filtered audio channel or other subband components with the harmonic spectral component to generate the output channel for the speaker. In some embodiments, the combination of the filtered or original audio channel and the harmonic spectral component may be further processed with e.g. equalization, compression, etc., to generate the output channel for the speaker.

In steps 805 to 825, a harmonic spectral component is generated for a frequency band of the audio channel. In some embodiments, multiple harmonic spectral components are generated and combined 830, where each of the harmonic spectral components are generated using a different frequency band of the audio channel. The output channel may be generated by combining the frequencies of the audio channel outside of the target frequencies of the harmonic spectral components. The harmonic spectral components may be generated in parallel or in series. For the series case, each downstream harmonic spectral component may be generated using as an input a residual of an upstream harmonic spectral component. In some embodiments, different speakers may have different available bandwidths or frequency responses. For example, a mobile device (e.g., mobile phone) may include unbalanced speakers. Different subband components may be used for frequency range extension for different speakers.

Example Computer

Figure 9:
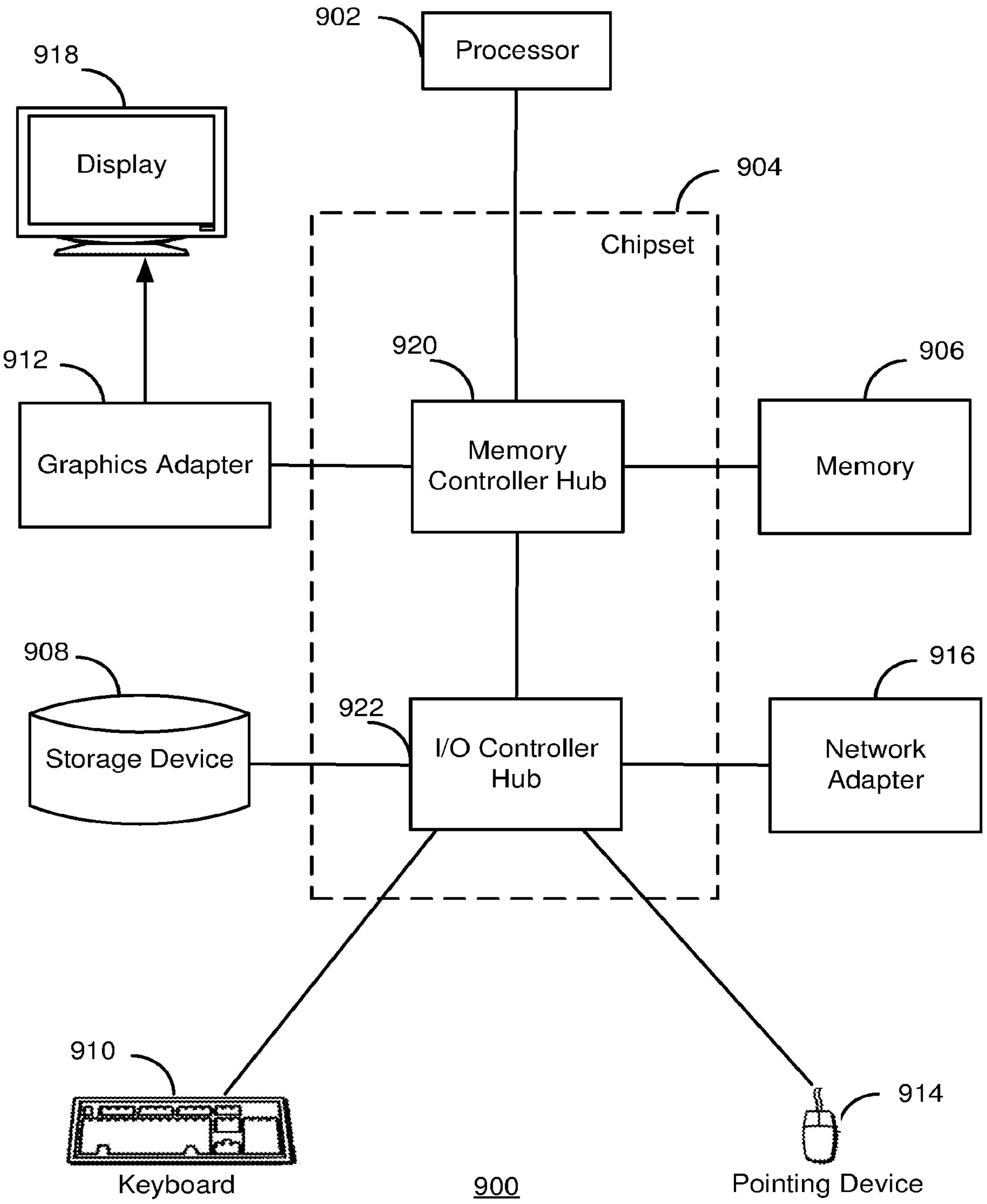
FIG. 9 is a block diagram of a computer, in accordance with some embodiments.

FIG. 9 is a block diagram of a computer 900, in accordance with some embodiments. The computer 900 is an example of circuitry that implements an audio system and its components, such as the audio system 100, or the filterbank module 120 or filterbank module 700. Illustrated are at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display device 918 is coupled to the graphics adapter 912. A storage device 908, keyboard 910, pointing device 914, and network adapter 916 are coupled to the I/O controller hub 922. The computer 900 may include various types of input or output devices. Other embodiments of the computer 900 have different architectures. For example, the memory 906 is directly coupled to the processor 902 in some embodiments.

The storage device 908 includes one or more non-transitory computer-readable storage media such as a hard drive, compact disk read-only memory (CD-ROM), DVD, or a solid-state memory device. The memory 906 holds program code (comprised of one or more instructions) and data used by the processor 902. The program code may correspond to the processing aspects described with reference to FIGS. 1 through 8.

The pointing device 914 is used in combination with the keyboard 910 to input data into the computer system 900. The graphics adapter 912 displays images and other information on the display device 918. In some embodiments, the display device 918 includes a touch screen capability for receiving user input and selections. The network adapter 916 couples the computer system 900 to a network. Some embodiments of the computer 900 have different and/or other components than those shown in FIG. 9.

Circuitry may include one or more processors that execute program code stored in a non-transitory computer readable medium, the program code when executed by the one or more processors configures the one or more processors to implement an audio processing system or modules of the audio processing system. Other examples of circuitry that implements an audio processing system or modules of the audio processing system may include an integrated circuit, such as an application-specific integrated circuit (ASIC), field-programmable gate array (FPGA), or other types of computer circuits.

Additional Considerations

Example benefits and advantages of the disclosed configurations include allowing speakers to effectively render (e.g., lower) frequencies beyond the physical capabilities of the speakers. By processing an audio signal as discussed herein, the rendered sound produces the impression of frequencies beyond the bandwidth of the physical driver.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, blocks, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for systems and processes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system, comprising:

a circuitry configured to:

receive an audio channel;

generate a harmonic spectral component having different frequencies from a set of target frequencies of the audio channel that produces a psychoacoustic impression of frequencies of the set of target frequencies when rendered by an audio rendering device, by applying a nonlinearity subject to scale-dependent constraints to components of the audio channel corresponding to the set of target frequencies; and combine the harmonic spectral component with frequencies of the audio channel outside of the set of target frequencies to generate an output channel to be rendered by the audio rendering device.

2. The system of claim 1, wherein:

the nonlinearity includes a weighted mixture of constituent nonlinearities; and the constraints each include a constraint on a gain correction applied to an input of a respective constituent nonlinearity.

3. The system of claim 2, wherein the nonlinearity includes a weighted summation of Chebyshev polynomials of the first kind with magnitudes being selectively factored out subject to the constraints.

4. The system of claim 1, wherein the circuitry is further configured to generate quadrature components from the audio channel defining a quadrature representation of the audio channel, wherein the harmonic spectral component is generated by applying the nonlinearity to the quadrature representation of the audio channel.

5. The system of claim 4, wherein the circuitry is further configured to:

generate rotated spectral quadrature components by applying a forward transformation that rotates a spectrum of the quadrature components from a standard basis to a rotated basis;

generate weighted phase-coherent harmonic spectral quadrature components by applying the nonlinearity to the components of the audio channel corresponding to the target frequencies in the rotated basis; and generate the harmonic spectral component by applying an inverse transformation that rotates a spectrum of the weighted phase-coherent harmonic spectral quadrature components from the rotated basis to the standard basis.

6. The system of claim 5, wherein:

the forward transform rotates the spectrum of the quadrature components such that a target frequency of the set of target frequencies is mapped to 0 Hz; and the inverse transform rotates the spectrum of the weighted phase-coherent harmonic spectral quadrature components such that 0 Hz is mapped to the target frequency.

7. The system of claim 1, wherein the circuitry is further configured to generate a plurality of harmonic spectral components, each harmonic spectral component being generated using a respective set of target frequencies of a different frequency band of the audio channel, and wherein the circuitry is configured to generate the output channel by combining the plurality of harmonic spectral components.

8. The system of claim 7, wherein the circuitry is configured to generate the plurality of harmonic spectral components in series with each downstream harmonic spectral component using as an input a residual of an upstream harmonic spectral component.

9. The system of claim 7, wherein the circuitry is configured to generate the plurality of harmonic spectral components in parallel.

10. The system of claim 1, wherein the circuitry is further configured to apply an odd nonlinearity to the harmonic spectral component.

11. The system of claim 1, wherein the set of target frequencies include a frequency between 18 Hz and 250 Hz.

12. The system of claim 1, wherein the circuitry is further configured to determine the set of target frequencies based on at least one of:

a reproducible range of the audio rendering device;

reduction of power consumption of the audio rendering device; or increased longevity of the audio rendering device.

13. The system of claim 1, wherein the audio rendering device is a component of a mobile device.

14. The system of claim 1, wherein the circuitry is further configured to isolate components of the audio channel corresponding to the set of target frequencies at target magnitudes using a gate function.

15. The system of claim 1, wherein circuitry is further configured to apply a smoothing function to components of the audio channel corresponding to the set of target frequencies.

16. A non-transitory computer readable medium comprising stored instructions that, when executed by at least one processor, configure the at least one processor to:

receive an audio channel;

generate a harmonic spectral component having different frequencies from a set of target frequencies of the audio channel that produces a psychoacoustic impression of frequencies of the set of target frequencies when rendered by an audio rendering device, by applying a nonlinearity subject to scale-dependent constraints to components of the audio channel corresponding to the set of target frequencies; and combine the harmonic spectral component with frequencies of the audio channel outside of the set of target frequencies to generate an output channel to be rendered by the audio rendering device.

17. The non-transitory computer readable medium of claim 16, wherein:

the nonlinearity includes a weighted mixture of constituent nonlinearities; and the constraints each include a constraint on a gain correction applied to an input of a respective constituent nonlinearity.

18. The non-transitory computer readable medium of claim 16, wherein the instructions, when executed by the at least one processor, further configure the at least one processor to generate quadrature components from the audio channel defining a quadrature representation of the audio channel, wherein the harmonic spectral component is generated by applying the nonlinearity to the quadrature representation of the audio channel.

19. The non-transitory computer readable medium of claim 18, wherein the instructions, when executed by the at least one processor, further configure the at least one processor to:

generate rotated spectral quadrature components by applying a forward transformation that rotates a spectrum of the quadrature components from a standard basis to a rotated basis;

generate weighted phase-coherent harmonic spectral quadrature components by applying the nonlinearity to the components of the audio channel corresponding to the target frequencies in the rotated basis; and generate the harmonic spectral component by applying an inverse transformation that rotates a spectrum of the weighted phase-coherent harmonic spectral quadrature components from the rotated basis to the standard basis.

20. The non-transitory computer readable medium of claim 16, wherein the instructions, when executed by the at least one processor, further configure the at least one processor to generate a plurality of harmonic spectral components, each harmonic spectral component being generated using a respective set of target frequencies of a different frequency band of the audio channel, and wherein the at least one processor is configured to generate the output channel by combining the plurality of harmonic spectral components.

21. A method, comprising, by a circuitry:

receiving an audio channel;

generating a harmonic spectral component having different frequencies from a set of target frequencies of the audio channel that produces a psychoacoustic impression of frequencies of the set of target frequencies when rendered by an audio rendering device, by applying a nonlinearity subject to scale-dependent constraints to components of the audio channel corresponding to the set of target frequencies; and combining the harmonic spectral component with frequencies of the audio channel outside of the set of target frequencies to generate an output channel to be rendered by the audio rendering device.

22. The method of claim 21, wherein:

the nonlinearity includes a weighted mixture of constituent nonlinearities; and the constraints each include a constraint on a gain correction applied to an input of a respective constituent nonlinearity.

23. The method of claim 21, further comprising generating quadrature components from the audio channel defining a quadrature representation of the audio channel, wherein the harmonic spectral component is generated by applying the nonlinearity to the quadrature representation of the audio channel.

24. The method of claim 23, further comprising:

generating rotated spectral quadrature components by applying a forward transformation that rotates a spectrum of the quadrature components from a standard basis to a rotated basis;

generating weighted phase-coherent harmonic spectral quadrature components by applying the nonlinearity to the components of the audio channel corresponding to the target frequencies in the rotated basis; and generating the harmonic spectral component by applying an inverse transformation that rotates a spectrum of the weighted phase-coherent harmonic spectral quadrature components from the rotated basis to the standard basis.

25. The method of claim 21, further comprising generating a plurality of harmonic spectral components, each harmonic spectral component being generated using a respective set of target frequencies of a different frequency band of the audio channel, and wherein the circuitry is configured to generate the output channel by combining the plurality of harmonic spectral components.

* * * * *